(12) United States Patent
McDonald et al.

(10) Patent No.: US 8,098,639 B2
(45) Date of Patent: Jan. 17, 2012

(54) SYSTEM AND METHOD FOR MANAGING COMMUNICATION CHANNEL ASSIGNMENTS FOR DIFFERENT TYPES OF COMMUNICATION UNITS IN A COMMUNICATION SYSTEM

(75) Inventors: Daniel J. McDonald, Cary, IL (US); John W. Maher, Woodstock, IL (US); David R. Mills, West Palm Beach, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 619 days.

(21) Appl. No.: 11/619,018

(22) Filed: Jan. 2, 2007

(65) Prior Publication Data

US 2008/0161029 A1 Jul. 3, 2008

(51) Int. Cl.
*H04W 4/00* (2009.01)
(52) U.S. Cl. .................. 370/338; 455/518; 455/519
(58) Field of Classification Search .................. 455/509, 455/416, 515–520, 552.1, 553.1, 422.1, 432.1, 455/436–439, 442, 447–455, 550.1, 556.1, 455/556.2; 370/338, 327–331, 310.2
See application file for complete search history.

(56) References Cited

U.S. PATENT DOCUMENTS

| | | | |
|---|---|---|---|
| 5,408,680 A * | 4/1995 | Hattey et al. ..................... | 455/15 |
| 5,504,939 A * | 4/1996 | Mayrand et al. ............... | 455/450 |
| 5,790,527 A * | 8/1998 | Janky et al. ................... | 370/330 |
| 6,181,585 B1 * | 1/2001 | Cardwell et al. ................ | 363/71 |
| 6,226,279 B1 * | 5/2001 | Hansson et al. ............... | 370/329 |
| 6,233,461 B1 * | 5/2001 | Chinitz et al. ................ | 455/522 |
| 6,308,079 B1 * | 10/2001 | Pan et al. ...................... | 455/519 |
| 6,498,787 B1 * | 12/2002 | Yi et al. ........................ | 370/328 |
| 6,567,653 B1 * | 5/2003 | Sanders ........................ | 455/126 |
| 7,797,007 B2 * | 9/2010 | McDonald et al. ........... | 455/518 |
| 2002/0067724 A1 * | 6/2002 | Helm et al. .................... | 370/390 |
| 2005/0032538 A1 * | 2/2005 | Noel et al. .................... | 455/518 |
| 2006/0003784 A1 * | 1/2006 | Chion et al. .................. | 455/518 |

\* cited by examiner

*Primary Examiner* — Kent Chang
*Assistant Examiner* — San Htun
(74) *Attorney, Agent, or Firm* — Terri Hughes Smith; Valerie M. Davis (57) ABSTRACT

System and method for efficiently managing communication channel assignments within talkgroups having dual mode communication units capable of operating on a first communication channel type and on a second communication channel type, and single mode communication units capable of operating only on the second communication channel type. If, at a base site, each of the communication units associated with a talkgroup is a dual mode communication unit, a call for that talkgroup is assigned to be broadcast using a channel of the first communication channel type. If, at least one of the communication units associated with the talkgroup at the base site is a single mode communication unit, the call for that talkgroup is assigned to a channel of the second communication channel type. As communication units roam between sites, channel assignments are continuously updated based on the types of communication units at each base site at any one time.

16 Claims, 4 Drawing Sheets

SYSTEM AND METHOD FOR MANAGING COMMUNICATION CHANNEL ASSIGNMENTS FOR DIFFERENT TYPES OF COMMUNICATION UNITS IN A COMMUNICATION SYSTEM

TECHNICAL FIELD OF THE DISCLOSURE

This disclosure relates generally to communication systems, and more particularly, to a system and method for managing communication channel assignments for different types of communication units in a communication system.

BACKGROUND OF THE DISCLOSURE

Communication systems typically include a plurality of dispatch consoles and communication units, such as mobile or portable radio units, that are geographically distributed among various base sites and console sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Whenever a call is initiated in the communication system, the zone controller assigns the call to an available wireless transmission channel by transmitting channel grant messages to the relevant base sites. The channel assignments are then advertised by the base sites to the communication units to inform the communication units of the particular channel on which the call will be broadcast.

As communication systems are upgraded, it is necessary to ensure that new components are interoperable with legacy components. For example, in Motorola ASTRO25 systems, legacy communication units may utilize 800 MHz frequencies to communicate with base site, while newer communication units are capable of operating at 800 MHz frequencies as well as 700 MHz frequencies. Typically, when calls are made within a single talkgroup having both types of communication units, restrictions are imposed on the channel assignments to ensure that all the communication units in the talkgroup can hear the call. Specifically, all calls in the talkgroup are restricted to using 800 MHz channels at all base sites in the call so that both types of communication units can participate in the call. Also, both types of communication units can roam between base sites during the call and continue to participate in the call. As a result, available 700 MHz channels cannot be efficiently utilized for the newer communication units when only newer communication units are present at one of the base sites in the call.

Accordingly, there is a need for a system and method for efficiently managing communication channel assignments within talkgroups having different types of communication units.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

A system and method for efficiently managing communication channel assignments within talkgroups having different kinds of communication units is disclosed. In a communication system, a dual mode communication unit may be capable of operating on a first communication channel type and a second communication channel type, while a single mode communication unit may be capable of operating only on the second communication channel type. When, at a base site, each of the plurality of communication units associated with a talkgroup is a dual mode communication unit, a call for that talkgroup may be assigned to be broadcast using a communication channel of the first communication channel type. If however, at least one of the communication units associated with the talkgroup at the base site is a single mode communication unit, the call for that talk group is assigned to a communication channel of the second communication channel type.

If, after the call has initially been assigned to a communication channel of the first communication channel type, it is determined that a single mode communication unit has roamed into the base site, the call may be assigned to be broadcast on a communication channel of the second communication channel type. The call is then deassigned from the communication channel of the first communication channel type and any communication units initially communicating using the communication channel of the first communication channel type switch over to the communication channel of the second communication channel type.

Similarly, if, after the call has initially been assigned to a communication channel of the second communication channel type, it is determined that each single mode communication unit associated with the talkgroup has roamed away from the base site, the call may be assigned to be broadcast on a communication channel of the first communication channel type. The call is then deassigned from the communication channel of the second communication channel type and any communication units initially communicating using the communication channel of the second communication channel type switch over to the communication channel of the first communication channel type.

It should be noted that the communication channel in the present disclosure is either a traffic channel or a control channel of a first or second channel type. In one embodiment, the communication system may comprise a dedicated control channel used by one or more base sites for transmitting various call initiation signals and identification codes. In other embodiments, however, the communication system may not comprise a dedicated control channel, and communication traffic may be delivered on all the communications channels in the communication system. For ease of explanation and clarity only, however, the following examples and description refers to the call being assigned to the traffic channel of the first or second channel type, but is not limited to such. Let us now describe the present disclosure in greater detail by referring to the figures below.

Figure 1:
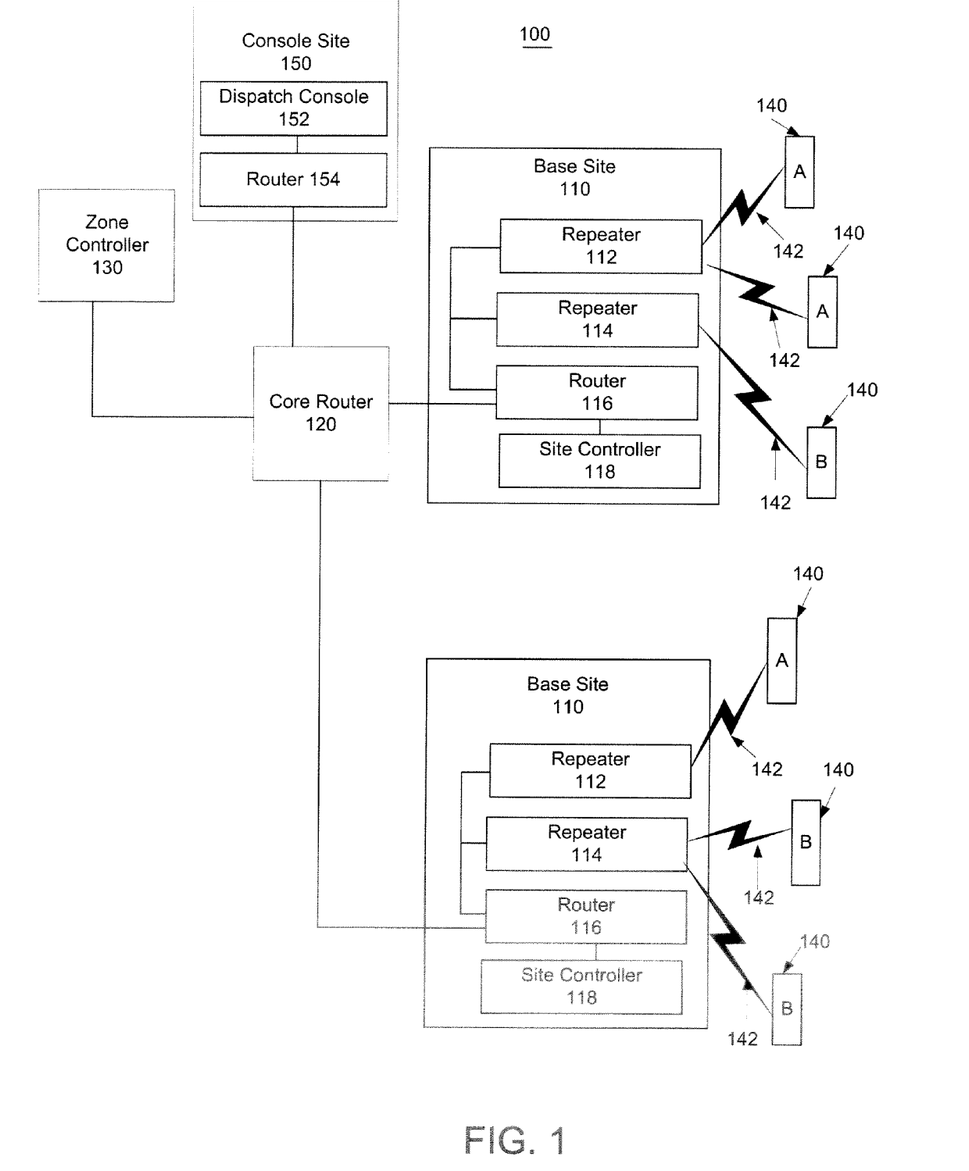
FIG. 1 shows one embodiment of a communication system according to the present disclosure.

FIG. 1 shows one embodiment of a single-zone communication system 100. The system 100 comprises a plurality of base sites 110 that are in communication with a core router 120. The core router is also coupled to a zone controller 130. The zone controller 130 manages and assigns Internet Protocol (IP) multicast addresses for payload (e.g., voice, data, video, etc.) and control messages between and among the various base sites 110. The zone controller 130 is also responsible for assigning communication channels at the base sites 110.

As depicted in FIG. 1, each base site 110 comprises a plurality of repeaters 112, 114 that are coupled, via Ethernet links, to an associated router 116, which is in turn coupled to the core router 120. Of course, while each base site 110 is illustrated having two repeaters 112, 114, it is understood that any number of repeaters may be provided at each base site 110. Each router 116 is also coupled to a site controller 118. The site controller 118 is configured to handle communication channel assignments for its respective base site 110 in the event the base site 110 is unable to communicate with the zone controller 130.

The repeaters 112, 114 at each base site 110 communicate using wireless communication resources 142 with communication units 140 within a specific coverage area. The wireless communication resources 142 may comprise any type of communication resource such as, for example, radio frequency (RF) technologies, including, but not limited to code division multiple access (CDMA), time division multiple access (TDMA), frequency division multiple access (FDMA), and the like. Other wireless technologies, such as those now known or later to be developed and including, but not limited to, infrared, Bluetooth, electric field, electromagnetic, or electrostatic transmissions, may also offer suitable substitutes.

The communication units 140 may be mobile or portable wireless radio units, cellular radio/telephones, video terminals, portable computers with wireless modems, or any other wireless devices. The communication units 140 may also be arranged into talkgroups having corresponding talkgroup identifications as known in the art. In FIG. 1, two separate talkgroups are illustrated, identified by labels "A" and "B." Of course, any number of talkgroups having corresponding talkgroup identifications may be established within the system 100.

The core router 120 may also be further coupled to a console site 150. The console site 150 includes at least one dispatch console 152 that is coupled via Ethernet links to a router 154, which is in turn coupled to the core router 120. Console sites can affiliate with either or both talkgroups "A" and "B" and, accordingly, may be considered members of both talkgroups "A" and "B." Although not shown in FIG. 1, it will be appreciated that a single site may include both repeaters and dispatch consoles. In one embodiment, the base sites 110, the core router 120, the zone controller 130 and the dispatch site 150 may be coupled using T1 lines, E1 lines, fiber optic lines, wireless links, Ethernet links, or any other suitable means for transporting data between the various components.

Practitioners skilled in the art will appreciate that the system 100 may also include various other elements not shown in FIG. 1. For example, although only two base sites 110 and one console site 150 are illustrated in FIG. 1, the system may include any number of base sites 110 or console sites 150. The system 100 may include remote sites configured to provide simulcast transmissions. The system 100 may also be linked to a public switched telephone network (PSTN), a paging network, or a facsimile machine. The communication system 100 may also be connected to a number of additional content sources, such as the Internet or various Intranets.

According to one exemplary embodiment in accordance with the present disclosure, the system 100 may be configured to broadcast and receive calls using two different channel types. Communication units 140 in the system 100 may also be single mode units capable of operating on only one of the two communication channel types, or dual mode units capable of operating on either communication channel type.

One example of such a system is the Motorola ASTRO25 system. In this system, each base site 110 includes at least one repeater (for example, repeater 112) capable of broadcasting and receiving calls using a 700 MHz communication channel, and at least one repeater (for example, repeater 114) capable of broadcasting and receiving calls using an 800 MHz communication channel. Of course, it should be understood that a single repeater may also be configured to broadcast multiple 700 MHz communication channels, multiple 800 MHz communication channels, or a combination of both 700 MHz and 800 MHz communication channels. Additionally, some of the communication units (also referred to as "dual mode communication units") in the Motorola ASTRO system are capable of operating on both 700 MHz or 800 MHz communication channels, while other communication units (also referred to as "single mode communication units) are capable of operating only on 800 MHz communication channels.

For clarity and exemplary purposes only, the following description and examples will be described with relation to the Motorola ASTRO25 system. However, it is understood that the present disclosure may also be used in any of the currently available RF communication systems, such as, for example, Global System for Mobile communication (GSM), General Packet Radio Service (GPRS), Universal Mobile Telecommunications Service (UMTS), Trans-European Trunked Radio service (TETRA), Dimetra, Association of Public Safety Communication Officers (APCO) Project 25, Personal Communication Service (PCS), Advanced Mobile Phone Service (AMPS), Integrated Dispatch Enhanced Network (iDEN), and the like.

Figure 2:
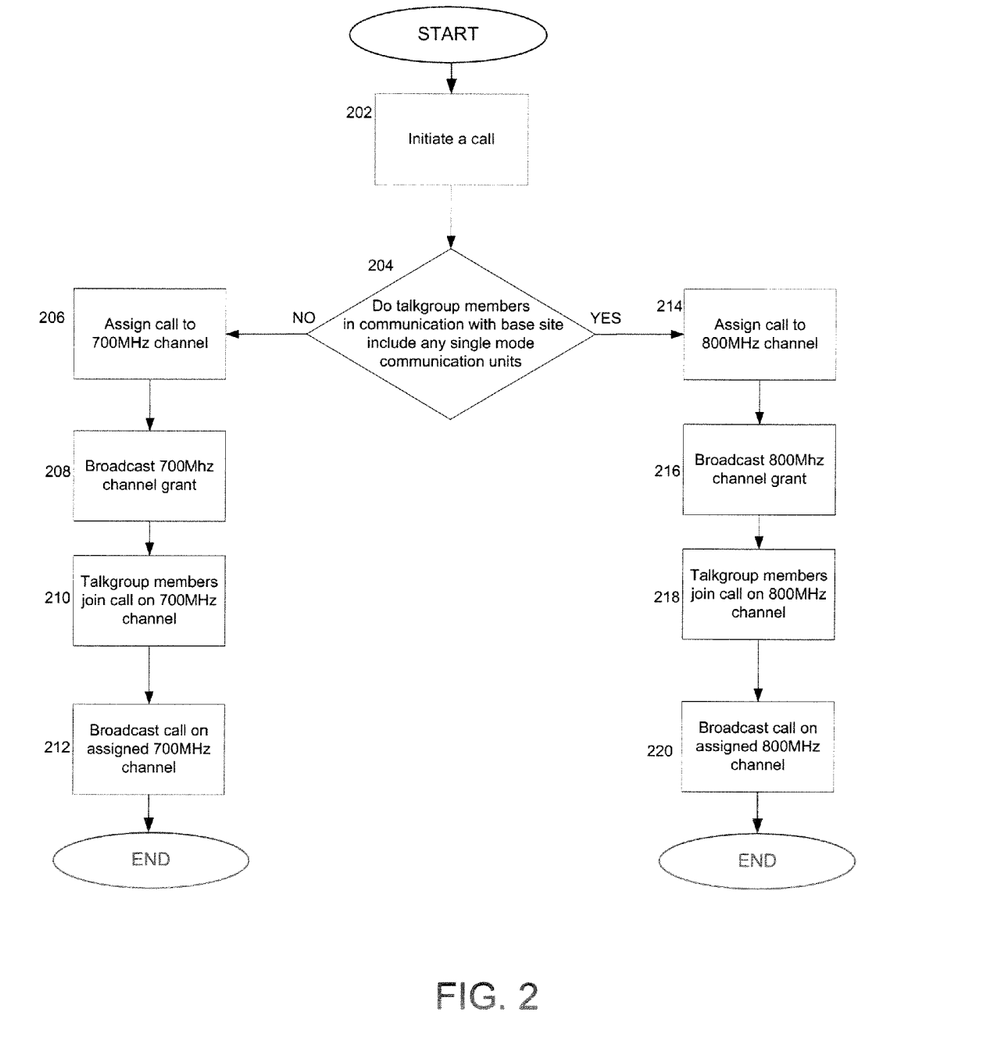
FIG. 2 shows one embodiment of a method according to the present disclosure for assigning communication channels for a talkgroup having both single mode and dual mode communication units.

When a call is first initiated, the zone controller 130 determines the talkgroup members in communication with each base site 110 and assigns a communication channel for the call accordingly. In FIG. 2, one embodiment of a method for assigning the communication channel for a talkgroup having both single mode and dual mode communication units is shown. A call is initiated in step 202. The zone controller 130 determines the talkgroup members in wireless communication with each base site 110 in step 204. If the talkgroup members at the base site 110 include only dual mode communication units, the call is assigned to a 700 MHz communication channel in step 206. In one embodiment, this is accomplished by transmitting a channel grant signal from the zone controller 130 to the base site 110 assigning the call to a particular 700 MHz communication channel.

In step 208, the base site 110 broadcasts the channel grant signal for the 700 MHz communication channel to inform any communication units 140 in the talkgroup that the call is to be broadcast on the assigned 700 MHz communication channel. In one embodiment, the channel grant signal is broadcast on a control channel. The communication units 140 in the talkgroup receive the channel grant signal and join the call using the assigned 700 MHz communication channel in step 210. The base site 110 broadcasts the call on the assigned 700 MHz communication channel in step 212.

If the talkgroup members at the base site 110 include at least one single mode communication unit, the call is assigned to an 800 MHz communication channel in step 214. The base site 110 broadcasts the channel grant signal for the 800 MHz communication channel in step 216. The communication units 140 in the talkgroup join the call using the assigned 800 MHz communication channel in step 218, and the base site 110 broadcasts the call on the assigned 800 MHz communication channel in step 220. This process ensures that all talkgroup members at a base site 110 are initially capable of participating in the call. Of course, it should be understood that, depending on the types of communication units 140 at each base site in the system, a single call may be assigned to a 700 MHz communication channel at one base site while simultaneously being assigned to an 800 MHz communication channel at another base site.

Figure 3:
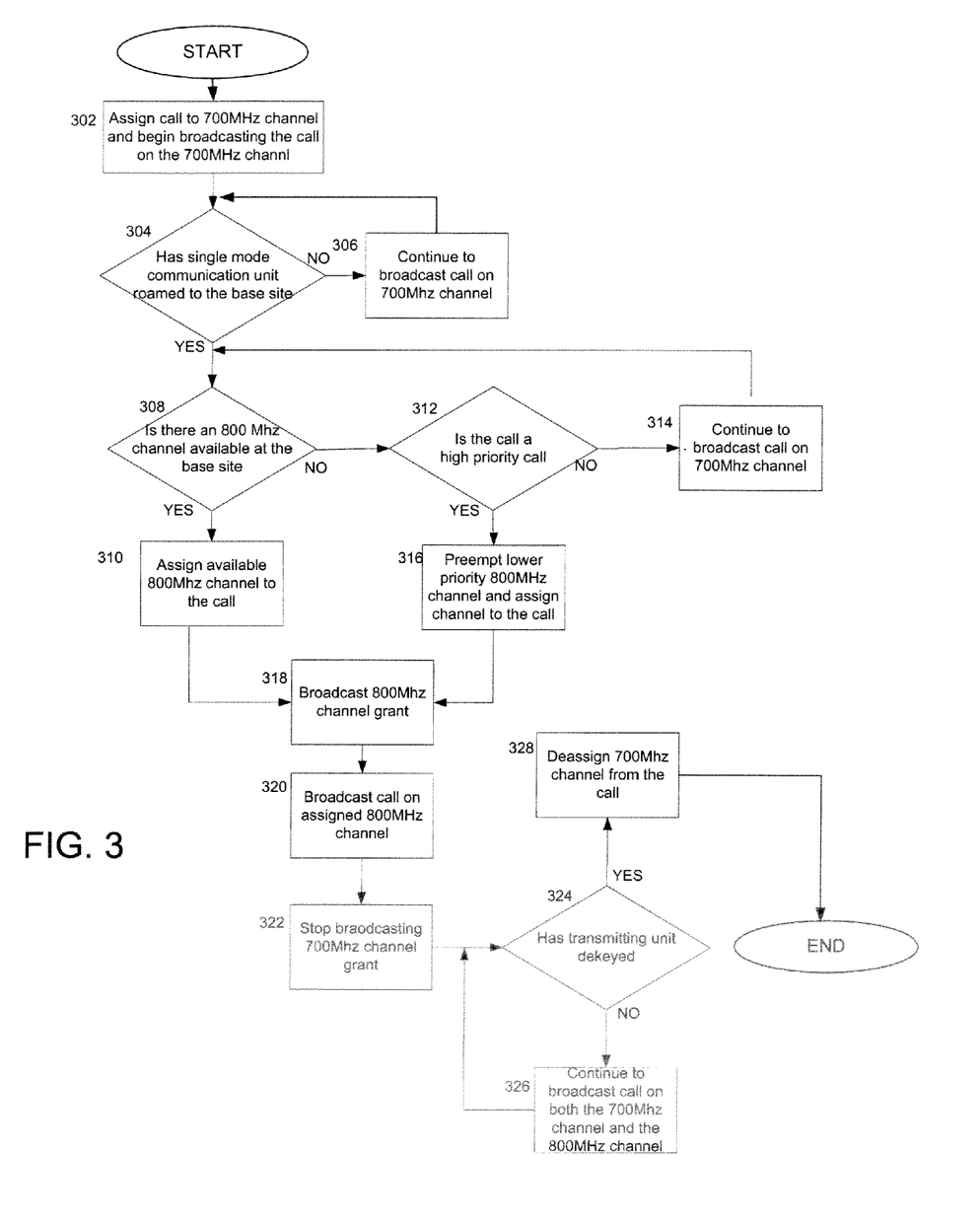
FIG. 3 shows one embodiment of a method according to the present disclosure for reassigning a communication channel when a single mode communication unit roams to a base site in communication with only dual mode communication units.

If a single mode communication unit later roams to a base site 110 previously assigned to broadcast the call on a 700 MHz communication channel, the call may be additionally assigned to an 800 MHz communication channel so that the single mode communication unit would be capable of participating in the call. In FIG. 3, one embodiment of a method is illustrated for reassigning the communication channel for a call when a single mode communication unit roams to a base site 110 previously assigned to broadcast the call on a 700 MHz communication channel. In step 302, a call is assigned to a 700 MHz communication channel (for example, by the process of FIG. 2) and the base site 110 begins broadcasting on the 700 MHz communication channel. In step 304, it is determined whether a single mode communication unit has roamed to the base site 110. If a single mode communication unit has not roamed to the base site 110, the call continues to be broadcast on the 700 MHz communication channel in step 306, and the process returns to step 304. If a single mode communication unit has roamed to the base site 110, the process proceeds to step 308.

In step 308, it is determined whether there is an 800 MHz communication channel available for the call. If an 800 MHz communication channel is available, the zone controller 130 assigns the available 800 MHz communication channel to the call in step 310. As above, this is accomplished by transmitting, from the zone controller 130 to the base site 110, a channel grant signal for the available 800 MHz communication channel.

If, however, an 800 MHz communication channel is not available, the process proceeds to step 312. In step 312, the zone controller 130 determines whether the call is a high priority call, such as an emergency call or any other type of high priority call. If the call is not a high priority call, the call continues to be broadcast on the 700 MHz communication channel in step 314, and the process proceeds back to step 308. Thus, if the call is not a high priority call, the call continues to be broadcast on the 700 MHz communication channel until it is determined in step 308 that an 800 MHz communication channel is available.

If the call is determined to be a high priority call, a lower priority call using an 800 MHz frequency is preempted in step 316 and the 800 MHz frequency of the preempted call is assigned to the call. Of course, it may occur that all 800 MHz frequencies are being used for high priority calls. In this instance, the base site may continue to broadcast the call on the 700 MHz communication channel until either an 800 MHz communication channel becomes available or a call currently being broadcasted on an 800 MHz communication channel is no longer considered a high priority call.

In step 318, the base site 110 begins broadcasting the channel grant signal for the assigned 800 MHz communication channel to inform any communication units 140 in the taklkgroup that the call is to be broadcast on the assigned 800 MHz communication channel. The base site 110 broadcasts the call on the assigned 800 MHz communication channel in step 320. The base site 110 also ceases broadcasting the channel grant signal for the originally assigned 700 MHz communication channel in step 322. At this time, the base site 110 continues to also broadcast and receive the call on the originally assigned 700 MHz communication channel as well as on the newly assigned 800 MHz communication channel. As a result, any communication units 140 joining the talkgroup or roaming to the base site 110 joins the call using the 800 MHz communication channel while any communication units 140 that originally joined the call using the 700 MHz communication channel continues to use the 700 MHz communication channel.

In step 324, the zone controller 130 determines whether a transmitting communication unit has dekeyed. The transmitting communication unit may be any communication unit 140 in the talkgroup that is transmitting on the call, and may be associated with any base site 110 in the communication system.

If the transmitting communication unit has not dekeyed, the base site 110 continues to broadcast the call on both the 700 MHz communication channel and the 800 MHz communication channel in step 326, and the process returns to step 324. If the transmitting communication unit has dekeyed, the 700 MHz communication channel is deassigned in step 326. Once the 700 MHz communication channel is deassigned, communication units 140 previously using the 700 MHz communication channel leave the 700 MHz communication channel. These communication units 140 then detect the broadcast channel grant signal for the 800 MHz communication channel, and rejoin the call using the 800 MHz communication channel. As a result, all of the talkgroup members at the base site 110 are able to participate on the call using a single 800 MHz communication channel, and the 700 MHz communication channel becomes available to be used for a different call.

By deassigning the 700 MHz communication channel upon the dekey of a transmitting communication unit, the communication units 140 originally assigned to the 700 MHz communication channel may move to the 800 MHz communication channel when the call is in hangtime, thus minimizing the loss of call information. Of course, it should be understood that the 700 MHz communication channel may also be deassigned upon other predetermined events or criteria. For example, call information may be prioritized, and the 700 MHz communication channel may be deassigned when the call information is considered less critical. In another example, the 700 MHz communication channel may be deassigned if there is another call that requires the use of that 700 MHz communication channel. In yet another example, the 700 MHz communication channel may be deassigned if no audio has been transmitted from the transmitting communication unit for a predetermined amount of time.

In another embodiment, the base site 110 may also be configured to transmit a transition grant signal instructing talkgroup members to switch from the 700 MHz communication channel to the 800 MHz communication channel. The transition grant signal may be transmitted following any of the predetermined events or criteria discussed above, at the command of a system administrator, or at any other time. The transition grant may also be transmitted on any type of communication channel. For example, in an embodiment using TDMA modulation, the transition grant signal may be broadcast as a link control or other embedded signal within a TDMA burst. The transition grant signal may also be broadcast on a control channel. The 700 MHz communication channel may then be deassigned once the transition grant signal has been transmitted, and/or it is determined that all of the communication units 140 have switched over to the 800 MHz communication channel.

Upon receiving the transition grant, the communication units 140 may also be configured to intelligently switch from the 700 MHz communication channel to the 800 MHz communication channel at a time when loss of call information is minimized. Thus, the communication units 140 may switch to the 800 MHz communication channel when a transmitting communication unit dekeys, when call information is determined to be less critical, at the end of the call, or if another call requires the 700 MHz communication channel. In an embodiment using TDMA modulation, each communication unit 140 may also switch from the 700 MHz communication channel to the 800 MHz communication channel during a time when the communication unit 140 is not receiving on its assigned time slot. Of course, the communication units 140 may also be configured to switch directly upon receiving the transition grant without employing any means to minimize the loss of call information. It should also be understood that each of the communication units 140 need not necessarily switch channels at the same time.

Communication channel assignments may also be reassigned if it is determined that each single mode communication unit of a talkgroup communicating with the base site 110 has roamed away from the base site 110. This may be used to free up an 800 MHz communication channel at the base site 110 when the talkgroup members at the base site 110 no longer include any single mode communication units.

Figure 4:
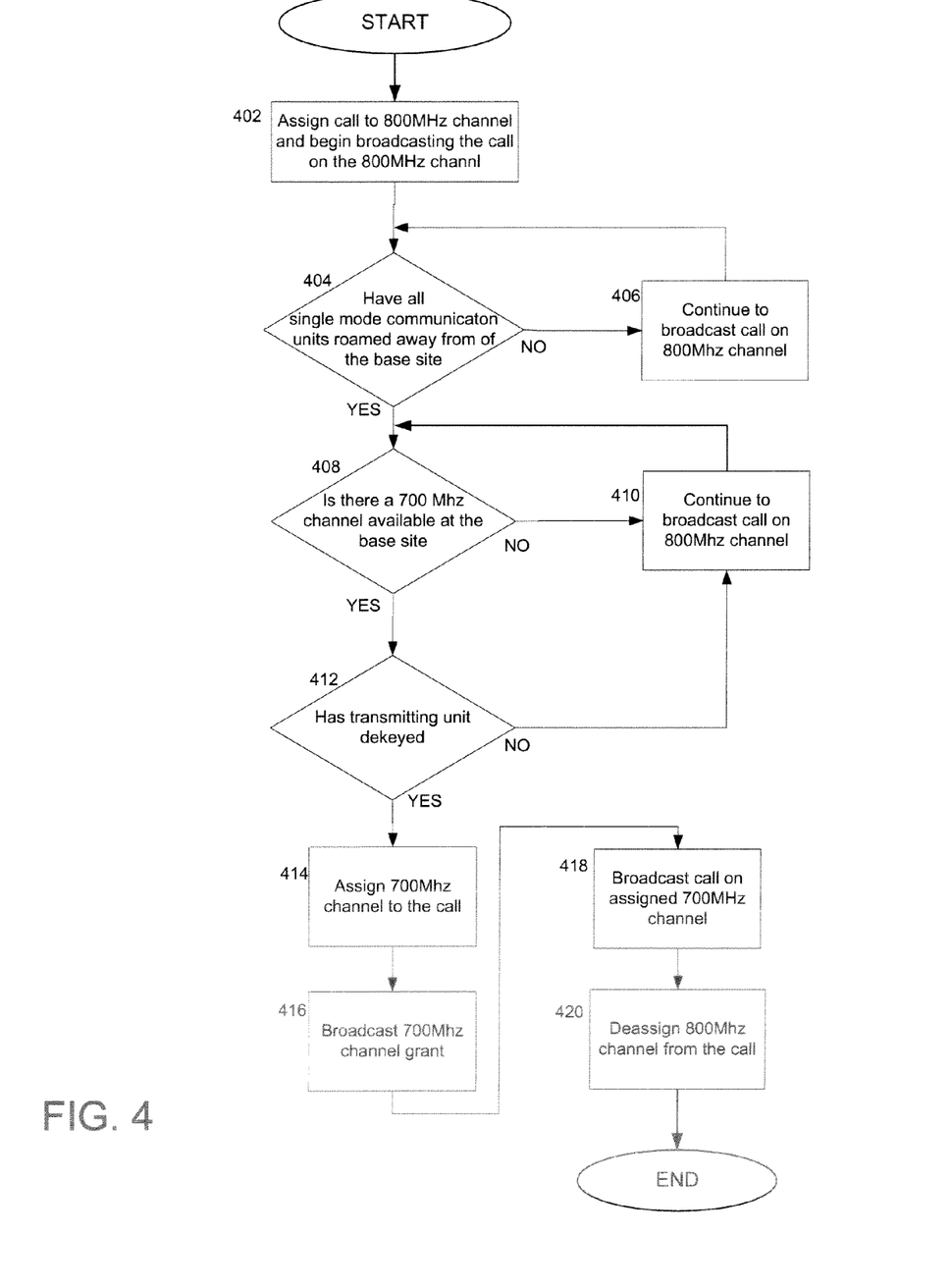
FIG. 4 shows one embodiment of a method according to the present disclosure for reassigning a communication channel when all single mode communication units roam away from a base site.

In FIG. 4, one embodiment is illustrated of a method for reassigning the channel for a call when all single mode communication units roam away from a base site 110 previously assigned to broadcast the call on an 800 MHz communication channel. In step 402, a call is assigned to an 800 MHz communication channel (for example, by the process of FIG. 2) and the base site 110 begins broadcasting on the 800 MHz communication channel. In step 404, it is determined whether all single mode communication units associated with a talkgroup have roamed away from the base site 110. If the talkgroup members communicating with the base site 110 still include any single mode communication units, the call continues to be broadcast on the 800 MHz communication channel in step 406. If it is determined that there are no longer any single mode communication units at the base site 110 that are part of the talkgroup, the process proceeds to step 408.

In step 408, it is determined whether there is a 700 MHz communication channel available for the call. If a 700 MHz communication channel is not available, the base site 110 continues to broadcast the call on the 800 MHz communication channel in step 410, and the process returns to step 408. If a 700 MHz communication channel is available, the process proceeds to step 412.

In step 412, the zone controller 130 determines whether a transmitting communication unit has dekeyed. If the transmitting communication unit has not dekeyed, the base site 110 continues to broadcast the call on the 800 MHz communication channel in step 410, and the process returns to step 408. If the transmitting communication unit has dekeyed, the zone controller 130 assigns the available 700 MHz communication channel to the call in step 414.

In step 416, the base site 110 broadcasts the channel grant signal for the assigned 700 MHz communication channel to inform any communication units 140 in the talkgroup that the call is to be broadcast on the assigned 700 MHz communication channel. The base site 110 also begins broadcasting the call on the assigned 700 MHz communication channel in step 418. In step 420, the zone controller 130 deassigns the 800 MHz communication channel from the call.

Once the 800 MHz communication channel is deassigned, communication units 140 previously using the 800 MHz communication channel leave the 800 MHz communication channel. These communication units 140 then detect the broadcast channel grant signal for the 700 MHz communication channel, and rejoin the call using the 700 MHz communication channel. As a result, all of the dual mode communication units at the base site 110 are able to participate on the call using a 700 MHz communication channel, and the 800 MHz communication channel becomes available to be used for a different call.

Of course, as with the process described in FIG. 3, the zone controller 130 may be configured to deassign the 800 MHz communication channel upon the occurrence of other predetermined events or criteria. The base site 110 may also be configured to transmit a transition grant signal to the talkgroup members on the 800 MHz communication channel to instruct any communication units 140 receiving the transition grant to switch from the 700 MHz communication channel to the 800 MHz communication channel.

Further advantages and modifications of the above described system and method will readily occur to those skilled in the art. For example, although the present disclosure is discussed with regards to communication units 140 operable on communication channels at 700 MHz or 800 MHz frequencies, it is understood that the communication units 140 may also be operable on other frequencies. The present disclosure may also be used for managing communication channel assignment for communication units 140 capable of operating using different modulation schemes. For example, a dual mode communication unit may be capable of using both FDMA modulated channels and TDMA modulated channels, while a single mode communication unit may only be capable of using FDMA modulated channels. The present disclosure may also be applied to communication units 140 operable in more than two modes. It should also be understood that any processes that are discussed above as being performed by the zone controller 130 may also be performed by a site controller 118 at a base site 110 in the event that the zone controller 130 is not operation or otherwise unable to control communication channel assignment for the base site.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for managing communication channel assignments at a base site configured to wirelessly communicate with a talkgroup having a plurality of talkgroup members, the plurality of talkgroup members including at least one of a single mode communication unit or a dual mode communication unit, the dual mode communication unit being capable of operating on a first communication channel type and a second communication channel type and the single mode communication unit being capable of operating only on the second communication channel type, the method comprising:
    assigning a call to a first communication channel of the first communication channel type upon determining that each talkgroup member in wireless communication with the base site is a dual mode communication unit;
    broadcasting the call from the base site using the first communication channel;
    determining that a single mode communication unit associated with the talkgroup has roamed to the base site;
    determining whether a communication channel of the second communication channel type is available at the base site;
    assigning the call to a second communication channel of the second communication channel type if a communication channel of the second communication channel type is available at the base site;
    broadcasting the call from the base site using the second communication channel;
    broadcasting, from the base site, a channel grant signal for the second communication channel; and
    deassigning the call from the first communication channel.

2. The method of claim 1 further comprising:
    if a communication channel of the second communication channel type is not available, determining if the call is a high priority call; and
    preempting a lower priority call on a communication channel of the second communication channel type.

3. The method of claim 1 further comprising ceasing broadcast of a channel grant signal for the first communication channel upon broadcasting the channel grant signal for the second communication channel.

4. The method of claim 1 wherein deassigning the call from the first communication channel includes deassigning the call from the first communication channel upon the occurrence of a predetermined event.

5. The method of claim 4 wherein the predetermined event includes at least one of a dekey by a transmitting communication unit, a transition grant being received by the transmitting communication unit, end of the call, and a loss of audio from the transmitting communication unit for a predetermined amount of time.

6. The method of claim 1 wherein the first communication channel type is comprised of a communication channel at a first frequency and the second communication channel type is comprised of a communication channel at a second frequency.

7. A method for managing communication channel assignments at a base site configured to wirelessly communicate with a talkgroup having a plurality of talkgroup members, the plurality of talkgroup members including at least one of a single mode communication unit or a dual mode communication unit, the dual mode communication unit being capable of operating on a first communication channel type and a second communication channel type and the single mode communication unit being capable of operating only on the second communication channel type, the method comprising:
    assigning a call to a first communication channel of the second communication channel type upon determining that at least one talkgroup member in wireless communication with the base site is a single mode communication unit;
    broadcasting the call from the base site using the first communication channel;
    determining that each single mode communication unit in the talkgroup has roamed away from the base site;
    determining whether a communication channel of the first communication channel type is available at the base site;
    assigning the call to a second communication channel of the first communication channel type if a communication channel of the first communication channel type is available at the base site;
    broadcasting the call from the base site using the second communication channel;
    broadcasting, from the base site, a channel grant signal for the second communication channel; and
    deassigning the call from the first communication channel.

8. The method of claim 7 further comprising ceasing broadcast of a channel grant signal for the first communication channel upon broadcasting the channel grant signal for the second communication channel.

9. The method of claim 7 wherein assigning the call to the second communication channel includes assigning the call to the second communication channel upon the occurrence of a predetermined event.

10. The method of claim 9 wherein the predetermined event includes at least one of a dekey by a transmitting communication unit, a transition grant being received by the transmitting communication unit, and a loss of audio from the transmitting communication unit for a predetermined amount of time.

11. A communication system comprising:
    a talkgroup having a plurality of talkgroup members, the plurality of talkgroup members including at least one of a single mode communication unit or a dual mode communication unit, the dual mode communication unit being capable of operating on a first communication channel type and a second communication channel type and the single mode communication unit being capable of operating only on the second communication channel type;
    a base site configured to communicate with the talk group members; and
    a controller configured to, upon initialization of a call, assign the call to a communication channel of the first communication channel type upon determining that each talkgroup member in wireless communication with the base site is a dual mode communication unit, and assign the call to a communication channel of a second communication channel type upon determining that at least one talkgroup member in wireless communication with the base site is a single mode communication unit
    wherein the controller is further configured to, at a base site having the call assigned to a communication channel of the first communication channel type, determine whether a single mode communication unit in the talkgroup has roamed to the base site, assign the call to a communication channel of the second communication channel type upon determining that a single mode communication unit in the talkgroup has roamed to the base site and determining that the communication channel of the second communication channel type is available, and deassign the call from the communication channel of the first communication channel type after assigning the call to the communication channel of the second communication channel type.

12. The communication system of claim 11 wherein the controller is configured to deassign the call from the communication channel of the first communication channel type upon the occurrence of a predetermined event.

13. The communication system of claim 12 wherein the predetermined event is at least one of a dekey by a transmitting communication unit, a transition grant being received by the transmitting communication unit, end of the call, and a loss of audio from the transmitting communication unit for a predetermined amount of time.

14. The communication system of claim 11 wherein the controllers is further configured to determine, if the communication channel of the second communication channel type is not available, whether the call is a high priority call, and preempt a lower priority call on a communication channel of the second communication channel type if the call is a high priority call.

15. The communication system of claim 11 wherein the controller is further configured to, at a base site having the call assigned to a communication channel of the second type, determine whether each single mode communication unit in the talkgroup has roamed away from the base site, assign the call to a communication channel of the first communication channel type if each single mode communication unit in the talkgroup has roamed away from the base site, and deassign the call from the communication channel of the second communication channel type after assigning the call to the communication channel of the first communication channel type.

16. The communication system of claim 11 wherein the system includes a plurality of base sites, and wherein the call is assigned to a communication channel of the first communication channel type at one of the plurality of base sites and the call is assigned to a communication channel of the second communication channel type at another one of the plurality of base sites.

* * * * *

UNITED STATES PATENT AND TRADEMARK OFFICE
CERTIFICATE OF CORRECTION

PATENT NO.         : 8,098,639 B2                                    Page 1 of 1
APPLICATION NO.    : 11/619018
DATED              : January 17, 2012
INVENTOR(S)        : McDonald et al.

It is certified that error appears in the above-identified patent and that said Letters Patent is hereby corrected as shown below:

In Fig. 3, Sheet 3 of 4, for Tag "302", in Line 3, delete "channl" and insert -- channel --, therefor.

In Fig. 3, Sheet 3 of 4, for Tag "322", in Line 1, delete "braodcasting" and insert -- broadcasting --, therefor.

In Fig. 4, Sheet 4 of 4, for Tag "402", in Line 3, delete "channl" and insert -- channel --, therefor.

In Fig. 4, Sheet 4 of 4, for Tag "404", in Line 3, delete "from of" and insert -- from --, therefor.

Signed and Sealed this
Eighteenth Day of December, 2012

David J. Kappos
*Director of the United States Patent and Trademark Office*